3,532,734
MANUFACTURE OF ACRYLONITRILE
George C. Anderson, Howard S. Young, and Edgar L. McDaniel, Kingsport, Tenn., assignors to Eastman Kodak Company, Rochester, N.Y., a corporation of New Jersey
No Drawing. Filed Mar. 25, 1966, Ser. No. 537,303
Int. Cl. C07c *121/02*
U.S. Cl. 260—465.3                11 Claims

ABSTRACT OF THE DISCLOSURE

Propylene, ammonia and oxygen are converted to acrylonitrile when contacted at an elevated temperature with a catalyst comprising a calcined mixture of an oxide or an acid or a salt of molybdenum, and at least one of an oxide or a salt of niobium and an oxide or a salt of tantalum. The catalyst optionally includes a calcined oxide or salt of arsenic.

---

This invention relates to a novel chemical process. More particularly this invention relates to a novel improved process for manufacturing acrylonitrile directly from ammonia, oxygen and propylene in a single step.

The improved process of our invention comprises contacting a vapor phase mixture of ammonia, oxygen, and propylene, at elevated temperature, with a solid catalyst comprising molybdenum having an average valence greater than zero and at least one of the metals niobium or tantalum having an average valence greater than zero combined with sufficient oxygen to satisfy the average valences of the molybdenum and the niobium or tantalum.

The chemical reaction which takes place during the process of our invention can be represented by the following equation:

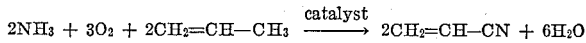

$$2NH_3 + 3O_2 + 2CH_2\text{=}CH\text{—}CH_3 \xrightarrow{\text{catalyst}} 2CH_2\text{=}CH\text{—}CN + 6H_2O$$

It can be seen from the foregoing equation that ammonia, oxygen and propylene react in the mole ratio of 2:3:2 to form acrylonitrile and water. Stated in another way, the theoretical mole ratio for the reaction of ammonia, oxygen and propylene to give acrylonitrile is 1:1.5:1, respectively.

Our process is a substantial improvement over other processes which have been proposed for manufacturing acrylonitrile from ammonia, oxygen and propylene. Many of the other processes for manufacturing acrylonitrile from ammonia, oxygen and propylene require the use of a large excess of ammonia in the feed. The use of such a large excess of ammonia reduces the spacetime yield of acrylonitrile obtained and results in a reaction product which is contaminated with ammonia. The ammonia in the reaction product tends to react with the acrylonitrile and further contaminate the reaction product. In addition, it is desirable for economic reasons to recover the ammonia from the reaction product and recycle the ammonia to the reaction zone. Efforts to overcome this troublesome problem by reducing the amount of ammonia in the feed stream have been largely unsuccessful in the various processes which have been suggested since a reduction in the amount of ammonia in the feed stream has invariably resulted in an increase in the amount of acrolein formed and a decrease in the conversion and yield of propylene to acrylonitrile. Furthermore, the contamination of the reaction product with acrolein results in purification problems which are as severe as those encountered when the reaction product is contaminated with ammonia. The novel process of our invention, on the other hand, is characterized by the substantial absence of acrolein from the reaction product. It is therefore unnecessary, in the process of our invention, to employ a large excess of ammonia and, as a consequence, the reaction product from the process of our invention need not be contaminated with ammonia. Small amounts of acetic acid, propionic acid and acrylic acid are obtained as by-products in our process but these acids are readily separable from the acrylonitrile which is the major reaction product.

We have now discovered a novel process for manufacturing acrylonitrile from ammonia, oxygen and propylene which is a substantial improvement over other proposed processes. Our improved process is based upon our discovery of a novel combination of reactants, reaction conditions and catalyst which are operative to produce acrylonitrile in unexpectedly high yields and conversions and in the absence of many of the problems which have plagued other processes.

The catalyst employed in the process of our invention is an ammoxidation catalyst which comprises molybdenum having an average valence greater than zero and at least one of the metals niobium or tantalum having an average valence greater than zero combined with sufficient oxygen to satisfy the average valences of the molybdenum and the niobium or tantalum. Our catalyst thus contains molybdenum and niobium or tantalum in an oxidized state. The catalyst also preferably contains arsenic with an average valence greater than zero combined with sufficient oxygen to satisfy the average valence of the arsenic. The oxidation catalyst of our invention is a solid which can be employed in the process in the form of granules, pellets, powder, etc. Since the reactions of ammonia, oxygen and propylene is highly exothermic, it is preferred to employ the catalyst in the form of a powder which is "fluidized" by the upward flow of the vapor-phase mixture through the catalyst. The use of such a fluidized bed greatly facilitates the control of the reaction temperature.

The solid catalyst is preferably supported but a support is not necessary. Silica is an especially effective catalyst support. Other useful catalyst supports include titania, silica-alumina, silicon carbide, etc. In general, the catalyst support can comprise from 0 to about 97 weight percent of the total weight of the catalyst.

The preferred silica-supported catalyst employed in the process of our invention are suitably prepared by mixing an appropriate amount of a soluble compound of niobium or tantalum with a silica aquasol and then adding to the mixture an appropriate amount of a soluble molybdenum compound to form a gel. The gel is then dehydrated, calcined and ground to the proper size.

Niobium or tantalum oxalate are among the preferred soluble compounds of niobium or tantalum for use in preparing the catalysts. Among the preferred soluble molybdenum compounds for use in preparing the catalysts are molybdic acids, salts of molybdic acids, heteropoly acids of molybdenum, salts of heteropolyacids of molybdenum, etc. Examples of specific useful soluble molybdenum compounds are ammonium heptamolybdate, ammonium hexamolybdochromiate, ammonium dodecamolybdocerate, molybdic acid, silicomolybdic acid, dodecamolybdoceric acid, etc. The catalyst can also contain small amounts of other metals in addition to molybdenum and niobium and/or tantalum, e.g., metals such as cerium, chromium, manganese, iron, nickel, aluminum, tin, germanium, copper, vanadium, thorium, or uranium, etc. These metals, if present in the catalyst, are often introduced into the catalyst as the central atom of a heteropoly acid of molybdenum or in the cation of a soluble salt of a molybdenum-containing acid.

Other suitable methods for preparing catalysts useful in the process of our invention include the dehydration of aqueous solutions containing appropriate amounts of soluble compounds of molybdenum and compounds of niobium and/or tantalum; the impregnation of a catalyst support with compounds of molybdenum and compounds of niobium and/or tantalum; etc.

Arsenic, if it is to be employed in the catalyst, can be incorporated during the preparation of the catalyst or after the catalyst is placed in the reactor. An arsenic compound, e.g., arsenic pentoxide, can be added to the mixture of silica aquasol, soluble molybdenum compound and soluble compound of niobium or tantalum when the catalyst is prepared by the preferred method described hereinbefore. If desired, an arsenic compound can be added to the catalyst after it has been ground to size or after it has been placed in the reactor, e.g., by vaporizing $As_2O_3$ into a vapor stream, e.g., air, inert gas, etc., which is contacted with the catalyst.

During operation of our process, volatile arsenic compounds, e.g., $As_2O_3$, may be evolved from the catalyst. An especially effective method for maintaining the desired arsenic content in the catalyst is to continuously or intermittently vaporize $As_2O_3$ into the vapor-phase mixture which is contacted with the catalyst.

Regeneration of the catalyst used in the process of our invention, if necessary, can be accomplished by contacting the catalyst with an oxygen-containing gas, e.g., air, air diluted with inert gas such as nitrogen or flue gas, oxygen, etc.

Because of the highly reactive nature of the vapor-phase mixture containing ammonia, oxygen and propylene which is contacted with the catalyst at elevated temperature, the exact structure of the catalyst is uncertain. The catalyst may be a mixture of one or more oxides of molybdenum with one or more oxides of niobium or tantalum and, when arsenic is present, one or more oxides of arsenic; or, it may be that the catalyst is a homogeneous micromixture of loose chemical combinations of oxides of molybdenum and oxides of niobium or tantalum with, optionally, oxides of arsenic. It is most likely that the catalyst contains oxides of molybdenum and niobium or tantalum as well as the various loose chemical combinations of oxides of molybdenum and niobium or tantalum mentioned hereinbefore. In any event, the catalyst does contain molybdenum in an oxidized state, i.e., with an average valence greater than zero and niobium and/or tantalum in an oxidized state, i.e., with an average valence greater than zero, combined with sufficient oxygen to satisfy the average valences of the molybdenum, niobium, and tantalum. When arsenic is present in the catalyst, it is also in an oxidized state, i.e., with an average valence greater than zero, and is combined in the catalyst with sufficient oxygen to satisfy the average valence of the arsenic.

The composition of the catalysts useful in the process of our invention can vary widely. In general, the catalysts useful in the process of our invention contain about 1 to about 34 weight percent molybdenum, about 0.5 to about 35 weight percent niobium or about 0.75 to about 41 weight percent tantalum and 0 to about 19 weight percent arsenic. The preferred catalysts for use in the process of our invention contain about 3 to about 27 weight percent molybdenum, about 1 to about 25 weight percent niobium or about 1.5 to about 29 weight percent tantalum and about 0.75 to about 12 weight percent arsenic.

As pointed out hereinbefore, the exact composition of the catalyst at the time the reaction occurs is not known with certainty. However, when the molybdenum content of the catalyst is reported as $MoO_3$, the niobium content of the catalyst is reported as $Nb_2O_5$, the tantalum content is reported as $Ta_2O_5$ and the arsenic content is reported as $As_2O_3$, the broad and preferred limits for the catalyst composition are as follows:

|  | Broad (weight percent) | Preferred (weight percent) |
| --- | --- | --- |
| $MoO_3$ | 2–50 | 5–40 |
| $Nb_2O_5/Ta_2O_5$ | 1–50 | 2–35 |
| $As_2O_3$ | 0–25 | 1–15 |
| Support | 0–97 | 10–92 |

It will be observed that the limits recited in the foregoing table correspond to the limits for the amount of active component in the catalyst which have been recited hereinbefore, e.g., a catalyst containing about 34 weight percent molybdenum contains about 50 weight percent $MoO_3$ if the molybdenum content is reported as $MoO_3$.

The vapor-phase mixture which is contacted with the solid catalyst generally contains ammonia, oxygen and propylene in a relative mole ratio of about 0.2:0.5:1 to about 2:4:1. The vapor-phase mixture preferably contains ammonia, oxygen and propylene in a relative mole ratio of about 0.5:0.5:1 to about 1:4:1. Air is the preferred source of oxygen. The nitrogen and other gases in air merely serve as diluent and exert no adverse effect on the process of our invention. It is also possible, and sometimes desirable, to add non-flammable diluents, e.g., steam, nitrogen, carbon dioxide, flue gas, etc. In addition, flammable diluents such as methane, propane, benzene, etc., can be added to the vapor-phase mixture which is contacted with the solid catalyst.

Since propylene and ammonia are flammable compounds, it is possible that the vapor-phase mixture of ammonia, oxygen and propylene can be within the flammable region of composition. It is preferable for the vapor-phase mixture to be outside of the flammable region of composition. This can be done by adding either a flammable diluent or a non-flammable diluent to the vapor-phase mixture as described above. It should be emphasized that the process of our invention is operative when the vapor-phase mixture is within the flammable region of composition and that it is sometimes desirable to operate with the vapor-phase mixture in the flammable region of composition. When operations are conducted with the vapor-phase mixture in the flammable region of composition, care should be taken to insure that the vapor-phase mixture is not exposed to sparks, open flames, etc.

The contacting of the reactants and the catalyst is carried out at elevated temperature with the reactants in the vapor phase. Suitable reaction temperatures are from about 300° C. to about 550° C. However reaction temperatures of from about 400° C. to about 500° C. are preferred.

Contact times between the reactants and the catalyst of from about 0.1 to about 20 seconds are suitable with the preferred contact times ranging from about 1 to about 10 seconds.

In the following examples, which illustrate the process of our invention, the conversion and yield, where shown, were calculated as follows:

$$\text{Conversion} = \frac{\text{Moles Acrylonitrile}}{\text{Moles Reactant Fed}} \times 100$$

$$\text{Yield} = \frac{\text{Moles Acrylonitrile}}{\text{Moles Reactant Consumed}} \times 100$$

EXAMPLE 1

A catalyst containing about 3.26% arsenic, about 3.5% niobium and about 26.6% molybdenum was prepared in the following manner. To 600 g. of 30% silica aquasol, ammonia-stabilized, was added 23 ml. of 1 $HNO_3$:3 $H_2O$ to acidify the sol. Then a solution of 81 g. of niobium oxalate, which contained 20 g. of $Nb_2O_5$, was prepared in 120 ml. of 10% aqueous oxalic acid and was added to the stirred sol followed by a solution of 20 g. of $As_2O_5$ in 50 ml. of water. To the stirred sol was added 218.6 g. of pulverized ammonium hexamolybdochromate. The mixture was heated until it thickened, then evaporated to a solid on a steam bath. It was dried overnight in an oven at 115° C., then calcined 2 hr. at 250° C. and 2 hr. at 450° C. in a muffle furnace. Following calcination, crushing, and sieving, 150 ml. of 80 x 200 mesh catalyst was charged to a fluid bed reactor. The catalyst was heated to 450° C. while fluidized in air and then it was used to synthesize acrylonitrile.

TABLE 1

| Temp., °C. | Contact time, sec. | Feed stream $C_3H_6$:air:$NH_3$: steam, moles | To acrylonitrile, percent | |
|---|---|---|---|---|
| | | | Conv. (on $C_3H_6$) | Yield (on $C_3H_6$) |
| 400 | 1.5 | 1:7.5:1:3 | 17.6 | 30.4 |
| 430 | 1.5 | 1:7.5:1:3 | 27.3 | 41.4 |

EXAMPLE 2

A catalyst containing about 3.26% arsenic, about 3.5% niobium and about 25% molybdenum was prepared as follows. To 667 g. of 30% silica aquasol which was stirred, was added 26 ml. of dilute nitric acid, followed by 160 g. of silicomolybdic acid as 40% solution, 81 g. of niobium oxalate dissolved in 120 ml. of 10% oxalic acid in water and 20 g. of $As_2O_5$ in 50 ml. of water. The mixture was evaporated on a steam bath with stirring, dried in an oven, and calcined in a muffle furnace for 3 hr. at 250° C. and 2 hr. at 450° C. Then 150 ml. of 80 x 200 mesh catalyst was charged to a fluid bed reactor. The data of Table 2 below were collected.

TABLE 2

| Temp., °C. | Contact time, sec. | Feed stream $C_3H_6$:air:$NH_3$: steam, moles | To acrylonitrile, percent | |
|---|---|---|---|---|
| | | | Conv. (on $C_3H_6$) | Yield (on $C_3H_6$) |
| 430 | 1.5 | 1:7.5:1:3 | 26.6 | 46.6 |
| 460 | 2.2 | 1:7.5:1:3 | 36.6 | 48.4 |

EXAMPLE 3

A catalyst containing about 6.52% arsenic, about 7% niobium and about 23.4% molybdenum was prepared as follows. To 750 g. of 30% silica sol, ammonia-stabilized, was added 216 g. of ammonium heptamolybdate dissolved in 225 ml. of water, followed by 650 g. of niobium oxalate solution containing the equivalent of 50 g. of $Nb_2O_5$. Then 50 g. of $As_2O_5$ dissolved in 120 ml. of water was added, and the resulting mixture was stirred and heated on a hot plate until it formed a pale blue-green gel. It was then dried on a steam bath, followed by heating overnight in an oven at 120° C. It was calcined 3 hr. at 250° C. and 2 hr. at 450° C. This catalyst was tested in a fluid-bed reactor, using 150 ml. of 80 x 200 mesh material, at 1.62 sec. contact time, with a molar feed of $C_3H_6$:air:$NH_3$:$H_2O$=1:7.5:1:1. The catalyst bed temperature was varied. After runs 1 and 2, the activity decreased, so 5 g. of $As_2O_3$ was added to the catalyst. The data are shown in Table 3.

TABLE 3

| Temp., °C. | Contact time, sec. | Feed stream $C_3H_6$:air:$NH_3$: steam, moles | To acrylonitrile, percent | |
|---|---|---|---|---|
| | | | Conv. (on $C_3H_6$) | Yield (on $C_3H_6$) |
| 450 | 1.62 | 1:7.5:1:1 | 60.0 | 82.4 |
| 480 | 1.62 | 1:7.5:1:1 | 41.0 | 44.4 |
| (Added 5 g. of $As_2O_3$ to catalyst) | | | | |
| 450 | 1.62 | 1:7.5:1:1 | 53.0 | 70.4 |

EXAMPLE 4

A series of catalysts containing niobium and molybdenum were prepared in accordance with the general procedure described in Example 3. In each case 150 ml. of catalyst was charged to the fluid bed reactor. With each catalyst sufficient granular $As_2O_3$ was added to the $Nb_2O_5$—$MoO_3$—$SiO_2$ to yield the desired concentration of arsenic, and then the catalyst was fluidized in air at 200° C. for about 1 hour before use. $As_2O_3$ was also fed in each run by means of a vaporizer immediately before the reactor through which the feed stream was passed. The vaporizer was operated at 153° C. The data shown in Table 4 were collected.

TABLE 4

| | Catalyst composition, weight percent | | | | | | | Temp., °C. | Contact time, sec. | Feed stream $C_3H_6$:air:$NH_3$: steam, moles | Acrylonitrile, percent | | | |
|---|---|---|---|---|---|---|---|---|---|---|---|---|---|---|
| | Nb | Reported as $Nb_2O_5$ | Mo | Reported as $MoO_3$ | As | Reported as $As_2O_3$ | $SiO_2$ | | | | Conv. (on $C_3H_6$) | Yield (on $C_3H_6$) | Conv. (on $NH_3$) | Yield (on $NH_3$) |
| 1 | 11.5 | 16.5 | 25.9 | 38.8 | 4.5 | 6.0 | 38.8 | 400 | 1.62 | 1:7.5:1:1 | 28.8 | 53.2 | | |
| | 11.5 | 16.5 | 25.9 | 38.8 | 4.5 | 6.0 | 38.8 | 400 | 1.62 | 1:7.5:1:1 | 30.3 | 51.1 | | |
| | 11.5 | 16.5 | 25.9 | 38.8 | 4.5 | 6.0 | 38.8 | 400 | 3.0 | 1:7.5:1:0 | 33.1 | 46.4 | | |
| | 11.5 | 16.5 | 25.9 | 38.8 | 4.5 | 6.0 | 38.8 | 400 | 3.0 | 1:7.5:1:0 | 39.9 | 56.4 | | |
| | 11.5 | 16.5 | 25.9 | 38.8 | 4.5 | 6.0 | 38.8 | 450 | 4.5 | 1:7.5:1:1 | 40.4 | 53.9 | | |
| | 11.5 | 16.5 | 25.9 | 38.8 | 4.5 | 6.0 | 38.8 | 450 | 1.62 | 1:7.5:1:1 | 51.4 | 70.9 | | |
| | 11.5 | 16.5 | 25.9 | 38.8 | 4.5 | 6.0 | 38.8 | 450 | 1.62 | 1:7.5:1:5 | 24.3 | 42.2 | | |
| | 11.5 | 16.5 | 25.9 | 38.8 | 4.5 | 6.0 | 38.8 | 450 | 1.62 | 1:10:1:1 | 54.6 | 68.4 | | |
| | 11.5 | 16.5 | 25.9 | 38.8 | 4.5 | 6.0 | 38.8 | 450 | 1.3 | 1:7.5:1:1 | 55.1 | 77.3 | | |
| | 11.5 | 16.5 | 25.9 | 38.8 | 4.5 | 6.0 | 38.8 | 450 | 1.62 | 1:6:1:1 | 55.1 | 87.1 | 55.1 | 78.7 |
| | 11.5 | 16.5 | 25.9 | 38.8 | 4.5 | 6.0 | 38.8 | 450 | 1.62 | 1:6:0.9:1 | 52.1 | 82.9 | 57.9 | 87.6 |
| | 11.5 | 16.5 | 25.9 | 38.8 | 4.5 | 6.0 | 38.8 | 450 | 1.62 | 1:6:0.8:1 | 52.5 | 75.8 | 65.6 | 76.7 |
| | 11.5 | 16.5 | 25.9 | 38.8 | 4.5 | 6.0 | 38.8 | 450 | 1.62 | 1:6:0.7:1 | 57.9 | 84.8 | 82.8 | |
| | 11.5 | 16.5 | 25.9 | 38.8 | 4.5 | 6.0 | 38.8 | 450 | 1.62 | 1:6:0.6:1 | 45.7 | 66.4 | 76.2 | 81.3 |
| | 11.5 | 16.5 | 25.9 | 38.8 | 4.5 | 6.0 | 38.8 | 450 | 1.62 | 1:6:0.5:1 | 43.6 | 67.8 | 87.1 | |
| | 11.5 | 16.5 | 25.9 | 38.8 | 4.5 | 6.0 | 38.8 | 450 | 1.62 | 1:6:0.4:1 | 30.0 | 45.5 | 75.0 | |
| | 11.5 | 16.5 | 25.9 | 38.8 | 4.5 | 6.0 | 38.8 | 450 | 1.62 | 1:6:1:0 | 49.3 | 80.5 | 49.3 | 64.8 |
| 2 | 2.63 | 3.76 | 17.0 | 25.5 | 1.9 | 2.5 | 68.3 | 450 | 1.62 | 1:6:0.7:1 | 36.8 | 62.7 | 52.5 | 58.2 |
| | 2.57 | 3.68 | 16.6 | 24.9 | 3.8 | 4.0 | 66.4 | 450 | 1.62 | 1:6:0.7:1 | 43.3 | 74.5 | 61.9 | 73.0 |
| | 2.51 | 3.59 | 16.2 | 24.3 | 5.7 | 7.5 | 64.6 | 450 | 1.62 | 1:6:0.7:1 | 41.9 | 73.2 | 59.9 | 73.0 |
| 3 | 5.04 | 7.20 | 14.7 | 22.1 | 1.9 | 2.5 | 68.3 | 450 | 1.62 | 1:6:0.7:1 | 46.0 | 71.7 | 65.7 | 74.8 |
| | 4.92 | 7.03 | 14.3 | 21.5 | 3.8 | 5.0 | 66.5 | 450 | 1.62 | 1:6:0.7:1 | 48.8 | 75.2 | 69.8 | 77.9 |
| | 4.75 | 6.8 | 14.0 | 21.0 | 5.7 | 7.5 | 64.7 | 450 | 1.62 | 1:6:0.7:1 | 50.7 | 80.5 | 72.4 | 82.9 |
| 4 | 9.02 | 12.9 | 10.9 | 16.3 | 1.9 | 2.5 | 68.3 | 450 | 1.62 | 1:6:0.7:1 | 47.6 | 75.7 | 68.0 | 83.2 |
| | 8.8 | 12.6 | 10.6 | 15.9 | 3.8 | 5.0 | 66.5 | 450 | 1.62 | 1:6:0.7:1 | 51.9 | 81.5 | 74.2 | 88.4 |
| 5 | 12.3 | 17.6 | 7.7 | 11.6 | 1.9 | 2.5 | 68.2 | 450 | 1.62 | 1:6:0.7:1 | 51.6 | 81.9 | 73.8 | 89.0 |
| | 12.0 | 17.1 | 7.5 | 11.3 | 3.8 | 5.0 | 66.6 | 450 | 1.62 | 1:6:0.7:1 | 58.3 | 89.5 | 83.4 | 96.9 |
| | 11.7 | 16.7 | 7.4 | 11.1 | 5.7 | 7.5 | 64.7 | 450 | 1.62 | 1:6:0.7:1 | 45.7 | 73.0 | 65.3 | 80.1 |
| 6 | 15.0 | 21.4 | 5.2 | 7.8 | 1.9 | 2.5 | 68.2 | 450 | 1.62 | 1:6:0.7:1 | 39.5 | 64.4 | 56.5 | |
| | 14.6 | 20.9 | 5.1 | 7.6 | 3.8 | 5.0 | 66.6 | 450 | 1.62 | 1:6:0.7:1 | 40.2 | 79.3 | 57.5 | |
| | 14.3 | 20.4 | 4.9 | 7.4 | 5.7 | 7.5 | 64.7 | 450 | 1.62 | 1:6:0.7:1 | 42.9 | 84.6 | 61.3 | |

EXAMPLE 5

A catalyst containing about 5% niobium and about 10.2% molybdenum supported on about 77.5% $SiO_2$ was prepared according to the general procedure of Example 3. 150 ml. of 80 x 200 mesh material was charged to a fluid bed reactor. $As_2O_3$ was fed when indicated, by passing the feed stream through a vaporizer at 153° C.

TABLE 5

| Temp., °C. | Contact time, sec. | Percent added $As_2O_3$ | $As_2O_3$ fed | Feed stream $C_3H_6$:air:$NH_3$: steam, moles | To acrylonitrile, percent | |
|---|---|---|---|---|---|---|
| | | | | | Conv. (on $C_3H_6$) | Yield (on $C_3H_6$) |
| 450 | 1.62 | 0 | No | 1:7.5:1:1 | 12.3 | 29.4 |
| 450 | 1.62 | 0 | No | 1:7.5:1:1 | 13.1 | 31.9 |
| 400 | 1.62 | 0 | No | 1:7.5:1:1 | 3.9 | 15.9 |
| 400 | 1.62 | 0 | No | 1:7.5:1:1 | 3.3 | 12.7 |
| 450 | 1.62 | 2.5 | Yes | 1:7.5:1:1 | 42.4 | 73.8 |
| 450 | 1.62 | 5 | Yes | 1:7.5:1:1 | 40.0 | 80.3 |

EXAMPLE 6

A catalyst was prepared which contained about 3.26% arsenic, about 6.6% tantalum and about 23.4% molybdenum supported upon about 47% silicon dioxide according to the following procedure. First, ammonium dodecamolybdocerate was prepared by adding slowly a solution of 100 g. of ceric ammonium nitrate in 1,000 ml. of water to a stirred, boiling solution of 600 g. of ammonium heptamolybdate in 2,000 ml. of water. The preparation was allowed to cool, and the supernatant fluid was decanted. After washing the canary yellow granular product with water by decantation, it was collected on a Büchner funnel, washed with methanol, and air-dried. To 627 g. of stirred ammonia-stabilized 30% silica sol which had been acidified to a pH of 6 with nitric acid was added 183 g. of pulverized ammonium dodecamolybdocerate. Then a solution of 20 g. of $As_2O_5$ in 50 ml. of water was added, followed by a solution of 148 g. of tantalum oxalate, containing 32 g. of $Ta_2O_5$, in 400 ml. of dilute aqueous oxalic acid. The mixture was heated on a hot plate with stirring for one hour, and then evaporated to dryness on a steam bath. It was calcined in a muffle furnace for 3 hours at 250° and 2 hours at 450°. Then the catalyst was crushed and sieved.

To the fluid-bed reactor was charged 150 ml. of 80 x 200 mesh catalyst. It was tested for acrylonitrile production. The data are presented in Table 6.

TABLE 6

| Temp., °C. | Contact time, sec. | Feed stream $C_3H_6$:air:$NH_3$: steam, moles | To acrylonitrile, percent | |
|---|---|---|---|---|
| | | | Conv. (on $C_3H_6$) | Yield (on $C_3H_6$) |
| 430 | 1.5 | 1:7.5:1:3 | 14.6 | 49.2 |
| 460 | 2.2 | 1:7.5:1:3 | 29.1 | 52.4 |

EXAMPLE 7

A catalyst containing about 8.6% tantalum and about 13% molybdenum supported on about 70% silicon dioxide was prepared according to the general procedure described in Example 3, using an appropriate amount of tantalum oxalate in place of niobium oxalate. 150 ml. of the catalyst was charged to a fluid bed reactor. To the catalyst was added 2.5 parts of $As_2O_3$, and this mixture was fluidized at 200° C. in air for 1 hour before use. The catalyst was tested at 450° C. and 1.62 seconds contact time. The propylene:air:ammonia:water mole ratios in the feed stream were 1:6:0.7:1. The conversion to acrylonitrile based on propylene was 44.4%, at a 70.4% yield based on propylene. The conversion based on ammonia was 63.4%. Acetonitrile was also formed in low concersion.

EXAMPLE 8

In order to show the synergistic effect of our catalyst, a series of catalysts containing niobium on silica, niobium and arsenic on silica, molybdenum on silica, and molybdenum plus arsenic on silica was prepared and tested. In each case the catalyst was tested at 450° C., 1.62 seconds contact time, and with a feed stream comprising propylene, air, ammonia, and stream in mole ratios of 1:6:0.7:1. The conversions and yields are shown in Table 7.

TABLE 7

| Catalyst composition | To acrylonitrile, percent | |
|---|---|---|
| | Conv. (on $C_3H_6$) | Yield (on $C_3H_6$) |
| 1 --- 21% niobium | 0 | 0 |
| 2 --- 1.9% arsenic, 20.5% niobium | 0 | 0 |
| 3 --- 20% molybdenum | 2.6 | 15.7 |
| 4 --- 1.9% arsenic, 19.5% molybdenum | 7.2 | 27.0 |

The data of Table 7 indicate that neither niobium and arsenic oxides on silica nor molybdenum and arsenic oxides on silica are effective catalysts for this reaction. It is necessary that the catalyst contain molybdenum and niobium, or tantalum. It is also desirable that the catalyst contain arsenic.

From the foregoing, it can be seen that our novel process for manufacturing acrylonitrile, comprising a novel combination of reactants, reactant conditions and catalysts is a substantial improvement over known processes which have been suggested for the preparation of acrylonitrile.

Although the invention has been described in considerable detail with particular reference to certain preferred embodiments thereof, variations and modifications can be effected within the spirit and scope of the invention as described hereinbefore and as defined in the appended claims.

We claim:

1. A process for the conversion of propylene to acrylonitrile which comprises contacting a vapor-phase mixture containing ammonia, oxygen and propylene at a temperature of about 300° to 500° C. with a solid, calcined catalyst composition consisting essentially of about:

| | Percent by weight |
|---|---|
| $MoO_3$ | 2–50 |
| $Nb_2O_5$ and/or $Ta_2O_5$ | 1–50 |
| Arsenic oxide selected from $As_2O_3$, $As_2O_5$ or mixtures thereof | 1–25 |
| Support | 0–97 |

2. The process of claim 1 wherein a support is present in an amount of about 10–92% by weight.

3. The process of claim 2 wherein a silica support is employed.

4. The process of claim 3 wherein the ammonia, oxygen and propylene are present in a relative molar ratio of about 0.2:0.5:1 to about 2:4:1, respectively.

5. The process of claim 1 wherein the temperature is about 400° to 500° C.

6. The process of claim 5 wherein the ammonia, oxygen and propylene are present in a relative molar ratio of about 0.5:0.5:1 to about 1:4:1, respectively.

7. A process for the conversion of propylene to acrylonitrile which comprises contacting a vapor-phase mixture containing ammonia, oxygen and propylene at a temperature of about 300° to 550° C. with a solid, calcined catalyst composition consisting essentially of about:

| | Percent by weight |
|---|---|
| $MoO_3$ | 5–40 |
| $Nb_2O_5$ and/or $Ta_2O_5$ | 2–35 |
| Arsenic oxide selected from $As_2O_3$, $As_2O_5$ or mixtures thereof | 1–15 |
| Support | 10–92 |

8. The process of claim 7 wherein a silica support is employed.

9. The process of claim 8 wherein the ammonia, oxygen and propylene are present in a relative molar ratio of about 0.2:0.5:1 to about 2:4:1, respectively.

10. The process of claim 7 wherein the temperature is about 400° to 500° C.

11. The process of claim 10 wherein the ammonia, oxygen and propylene are present in a relative molar ratio of about 0.5:0.5:1 to about 1:4:1, respectively.

References Cited

UNITED STATES PATENTS

| 3,173,957 | 3/1965 | McDaniel et al. 260—465.3 XR |
| 3,253,014 | 5/1966 | McDaniel et al. 260—465.3 |
| 3,262,962 | 7/1966 | McDaniel et al. |
| 3,282,860 | 11/1966 | McDaniel et al. 260—465.3 |
| 3,342,849 | 9/1967 | Brill et al. 260—465.3 |

FOREIGN PATENTS

| 3,262,962 | 7/1966 | McDaniel et al. |
| 1,235,297 | 3/1967 | Germany. |

JOSEPH P. BRUST, Primary Examiner

U.S. Cl. X.R.

252—455, 456, 462, 467; 260—533

UNITED STATES PATENT OFFICE
CERTIFICATE OF CORRECTION

Patent No. 3,532,734  Dated October 6, 1970

Inventor(s) George C. Anderson; Howard S. Young and Edgar L. McDaniel

It is certified that error appears in the above-identified patent and that said Letters Patent are hereby corrected as shown below:

Table 4, Section 2, Column 6 entitled "Reported as $As_2O_3$", 4.0 should read - - 5.0 - -.

Table 4, Section 1, Column 8 entitled "Temp. °C.", the fifth number should read - - 400 - - rather than "450".

Table 4, Section 1, Column 8 entitled "Temp. °C.", the seventh number should read - - 400 - - rather than "450".

Column 8, Claim 1, line 53, "500°C." should read - - 550°C. - -.

Signed and sealed this 8th day of June 1971

(SEAL)
Attest:

EDWARD M. FLETCHER, JR.
Attesting Officer

WILLIAM E. SCHUYLER, JR.
Commissioner of Patents